US005508730A

United States Patent [19]

Klein

[11] Patent Number: 5,508,730

[45] Date of Patent: Apr. 16, 1996

[54] PHOTOSETTING APPARATUS, PARTICULARLY A LASER EXPOSER, HAVING A CYLINDRICAL BED

[75] Inventor: Ottokar Klein, Weiterstadt, Germany

[73] Assignee: Linotype-Hell AG, Eschborn, Germany

[21] Appl. No.: 196,241

[22] PCT Filed: Jun. 19, 1992

[86] PCT No.: PCT/DE92/00509

§ 371 Date: Feb. 18, 1994

§ 102(e) Date: Feb. 18, 1994

[87] PCT Pub. No.: WO94/00295

PCT Pub. Date: Jan. 6, 1994

[51] Int. Cl.[6] .......................... B41B 19/00; G03B 41/00

[52] U.S. Cl. .......................................... 347/264; 347/262

[58] Field of Search ............................ 346/107 R, 108, 346/160; 355/200, 211; 347/262, 264

[56] References Cited

U.S. PATENT DOCUMENTS

| | | | |
|---|---|---|---|
| 4,684,228 | 8/1987 | Holthusen | 347/259 |
| 4,712,896 | 12/1987 | Holthusen | 354/5 |
| 4,884,082 | 11/1989 | Sonoda et al. | 347/119 |
| 5,289,233 | 2/1994 | Sakamoto et al. | 422/129 |

FOREIGN PATENT DOCUMENTS

| | | | |
|---|---|---|---|
| 0217136A2 | 4/1987 | European Pat. Off. | B41B 19/00 |
| 3604360A1 | 8/1987 | Germany | B41B 21/32 |
| 4040681A1 | 7/1992 | Germany | B41B 21/32 |

*Primary Examiner*—Benjamin R. Fuller
*Assistant Examiner*—Raquel Yvette Gordon
*Attorney, Agent, or Firm*—Hill, Steadman & Simpson

[57] ABSTRACT

A photosetting apparatus is provided having a cylindrical bed into which sheet-shaped photo-material is transported and placed against an inside thereof. The cylindrical bed has a longitudinal axis positioned in spaced relation from an inside surface of the bed and such that the cylindrical bed inside surface curves in cylindrical fashion partially around the longitudinal axis. An exposure optics exposes the sheet-shaped photo-material, the exposure optics being displaceable along the longitudinal axis of the cylindrical bed. A conveyor mechanism conveys the photo-material parallel to and in a direction along the longitudinal axis of the cylindrical bed into a position adjacent the inside surface of the bed. A guide mechanism having movable elements presses the photo-material against the inside surface of the cylindrical bed from inside.

15 Claims, 6 Drawing Sheets

PHOTOSETTING APPARATUS, PARTICULARLY A LASER EXPOSER, HAVING A CYLINDRICAL BED

BACKGROUND OF THE INVENTION

The invention is directed to a photosetting apparatus, particularly a laser exposer, having a cylindrical bed wherein a sheet-shaped photo material is transported into the cylindrical bed and placed against and inside thereof. An exposure optics having a rotatable portion is displaceable along a direction of a longitudinal axis of the cylindrical bed.

In such a photosetting apparatus having a cylindrical bed, which can also be referred to as a circular cylindrical segment, a part of the exposure optics, particularly a rotating mirror, is rotatable around the longitudinal axis of the cylindrical bed and is displaceable in the direction thereof in order to expose photomaterial along scan lines. This photomaterial is held inside at the cylindrical bed and has its light-sensitive layer directed toward the longitudinal axis of the cylindrical bed. Since the same path section from the rotating mirror up to the light-sensitive layer is always bridged for this purpose, and since the ray beam always impinges the light-sensitive material at the same angle, advantages derive, particularly due to a simple imaging optics and a uniform, sharp exposure of constant exposure intensity for the entire format to be exposed.

In such a photosetting apparatus having a cylindrical bed, however, the sheet-shaped photomaterial must be conveyed from an approximately planar position in which it is normally most simply conveyed into the curved cylindrical bed and must be held pressing against the inside of the cylindrical bed before the exposure event can occur. For this purpose the photomaterial in a known photosetting apparatus (German Patent 36 04 360) of this type is conveyed into the cylindrical bed through an open jacket section in the direction of the inside circumference thereof while being guided, and is pulled from the cylindrical bed after the exposure event in an analogous way. The conveying event in the cylindrical bed thus occurs in a circumferential direction thereof. For this purpose, two guide rings each comprising a front stop and introduced into the cylindrical bed or circular cylindrical segment with axial spacing are provided in detail as guide elements that engage at lateral edges of the photomaterial. The outside diameters of these guide rings correspond to the inside diameter of the cylindrical bed or, respectively, of the circular cylindrical segment. Axially extending guide members are provided before the start and following the end of the exposure region. These guide members guide the photomaterial along its breadth and convey it into the curvature of the inside of the circular cylindrical segment in the fashion of a restricted guidance. What is thereby disadvantageous is that plates—such as photomaterial that is to be directly exposed—can only be introduced with difficulty because of the stiffness of the printing plates, since they must be conveyed in the curved shape within the circular cylindrical segment after they were curved upon introduction. Scratches can easily occur in this curving process and in the following conveying process. These can be entirely avoided only with auxiliary devices that increase the expense. Furthermore, photomaterials of arbitrary length cannot be processed without further ado; on the contrary, conveying these through the circular cylindrical segment would likewise assume comparatively complicated auxiliary devices.

SUMMARY OF THE INVENTION

It is an object of the present invention to improve a photosetting apparatus of the type initially cited such that stiff photomaterial, particularly printing plates, can also be introduced into the cylindrical bed and can be held at the inside thereof with exact adjacency, whereby the length of the photomaterial should not be critical.

According to the invention, a photosetting apparatus is provided having a cylindrical bed into which a sheet-shaped photo material can be transported and placed against an inside thereof. An exposure optics is provided which is displaceable in a direction along a longitudinal axis of the cylindrical bed. A conveyor means conveys the photo material parallel to the longitudinal axis of the cylindrical bed. A guide means having movable elements presses the photo material against the cylindrical bed from the inside such that lateral edges of the photo material lie parallel to the longitudinal axis of the cylindrical bed. The photosetting apparatus equipped in this way is suitable both for processing printing plates as well as for processing traditional plate material or roll (film) material.

According to the invention, the photomaterial is drawn into the cylindrical bed in the longitudinal direction thereof in an essentially flat plane, is mechanically applied against the inside of the cylindrical bed before the exposure, is moved back into the flat plane after the exposure, and is conveyed out of the inside of the cylindrical bed in the longitudinal direction thereof.

As a result of the inventive design of the photosetting apparatus and as a result of the method that can be implemented therewith, thus, the events of conveying the photomaterial and the seating thereof at the inside against the cylindrical bed are implemented in uncoupled fashion or, respectively, in separate steps. The conveying of the photomaterial thereby occurs in planar fashion, so that simple guides are adequate for the conveying and scratches are avoided.

The length of the conveyed photomaterial is thereby not critical and, in particular, plays no part in the completely arced seating of the photomaterial against the cylindrical bed, since the photomaterial is seized for this purpose by an uncomplicated means over the entire longitudinal axis of the cylindrical bed, is arced up, and can be held in the upwardly arced position.

In an especially advantageous way according to the invention, the guide means comprises pivotable insertion rails arranged at a distance from one another and having a guide slot, and also comprises pivotable rods on which the photomaterial lies in an essentially flat plane in a draw-in position. The guide slots of the insertion rails then also lie in this flat plane. The rods can be pivoted into an upper insertion position in that they promote the draw-in event of the insertion rails. The rods press the film material into the cylindrical bed, whereby a great stiffness of the photomaterial can also be overcome without scratching the photomaterial. The insertion rails can be pivoted into the insertion position synchronously with the pivotable rods, as a result whereof, the photomaterial held in guide slots at its longitudinal edges is tangentially pressed into the cylindrical bed with exact adjacency. In its impressed position, the photomaterial presses laterally against one of the two insertion rails in the slot, the photomaterial being thus aligned. In the exposure position, the photomaterial is held against the cylindrical bed only with two insertion rails, whereas the rods are pivoted back away from the photomaterial wherein they do not disrupt the beam path of the exposure optics. The known, fundamental advantages of the photosetting apparatus having a cylindrical bed as a photomaterial carrier can thus remain undeteriorated. The photomaterial is not moved during exposing, as a result whereof the high exposure precision is retained, given large exposure formats. The mechanical properties of the photomaterial, the area dimensions and thickness, have no influence on the exposure precision. Directly exposable printing plates can thus be processed without further ado. Since the seating of the film in the cylindrical bed occurs mechanically, no apparatus parts are required for generating, supplying and distributing an under-pressure to the photomaterial.

In order to be able to convey different lengths of photomaterial into the cylindrical bed and out from the cylindrical bed, each of the two insertion rails comprises at least one pair of draw-in rollers whose nip lies in the plane of the guide slots. The processable photomaterial lengths can be expanded by the position of these draw-in rollers or, respectively, of the insertion rail.

However, it is also possible to process different widths of photomaterial, for which purpose the radius of the cylindrical bed is adapted by utilizing an appropriate cylindrical bed.

At least one draw-in roller of a pair of draw-in rollers is expediently spring-mounted and liftable, as a result whereof, the alignment of the photomaterial at an intermediate stop is enabled.

Furthermore, at least one of the insertion rails can comprise a perforating means with which the photomaterial can be held and can be perforated when this is desirable for further-processing of the photomaterial.

For exact guidance of the insertion rails and, thus, exact seating of the photomaterial against the inside of the cylindrical bed without producing a relative motion between the insertion rails and the photomaterial that damages the photomaterial, the insertion rails are guided in guide plates. At least one guide roller seated at the insertion rail thereby engages into at least one guideway in the guide plate.

For assisting in this insertion event of the photomaterial, the rods on which the photomaterial initially rests during the planar conveying are connected via at least one respective lever to a shaft with which they are pivoted into the upper insertion position.

The drive means of the photosetting apparatus comprises a pair of input rollers with which the photomaterial can be conveyed from a cassette or from a sheet holder into the cylindrical bed, particularly to draw-in rollers in the interior thereof. It further comprises a pair of output rollers with which the photomaterial can be conveyed from the cylindrical bed, particularly from the draw-in rollers to an output cassette or directly into a developing apparatus. Given this design of the drive means, for example, the film can be directly guided on a closed path from the supply cassette via the cylindrical bed, wherein the exposure event occurs, up to the developing apparatus from which the developed photomaterial is output.

When film is being processed as photomaterial, a cutter means is expediently arranged between that pair of input rollers that is arranged following the cassette in a conveying direction of the photomaterial and the insertion rails. Before cutting the film, this is conveyed at least up to the draw-in rollers at the insertion rails, the pair of input rollers particularly serving this purpose. After the film section has been cut off, the draw-in rollers at the insertion rails bring only the film section into the ultimate position.

The invention shall be set forth below with reference to a drawing having six figures wherein a typographic laser exposer is shown.

DESCRIPTION OF THE PREFERRED EMBODIMENTS

In part, the figures deviate from one another with respect to their presentation scale.

Figure 1:
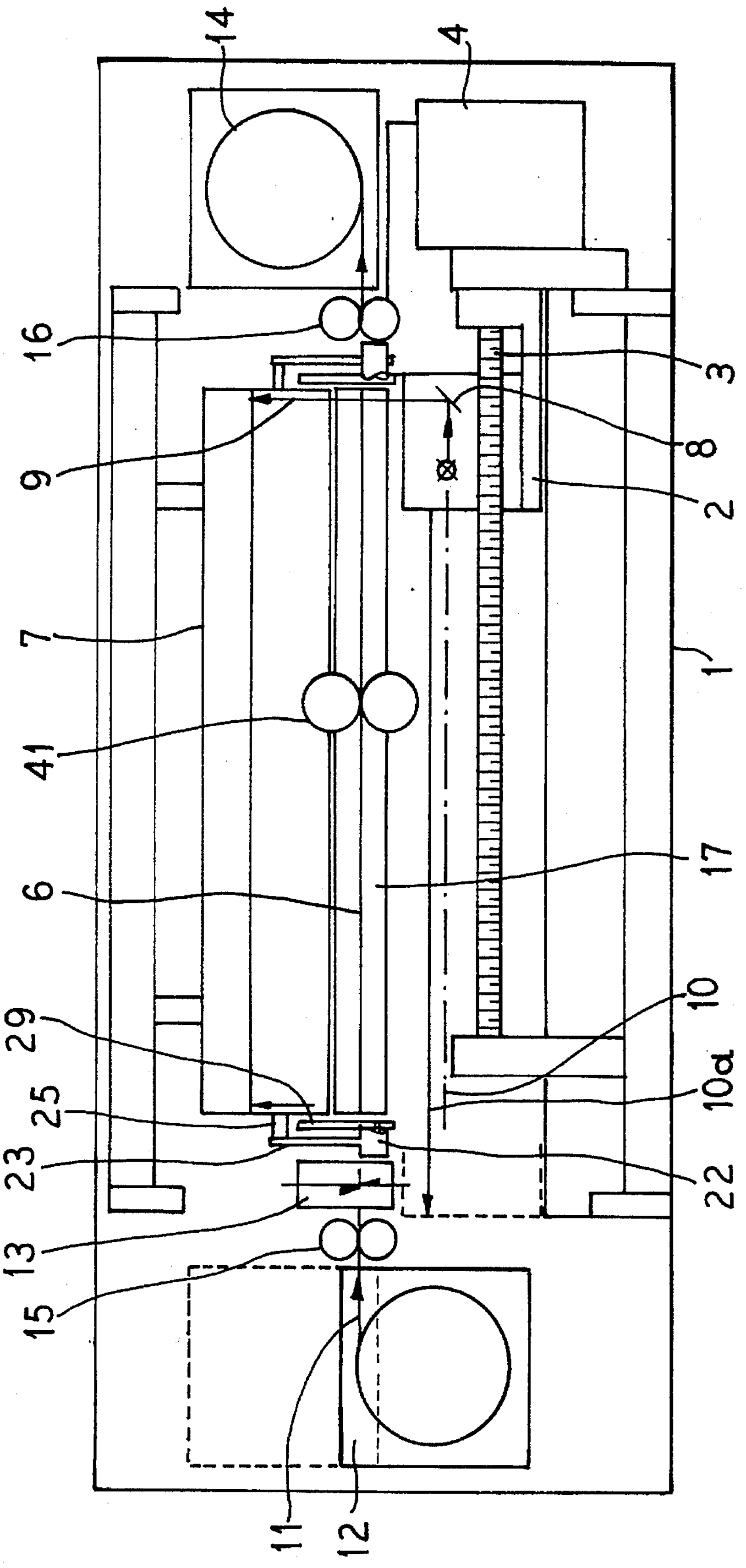
FIG. 1 illustrates the laser exposure in a longitudinal section.
Figure 2:
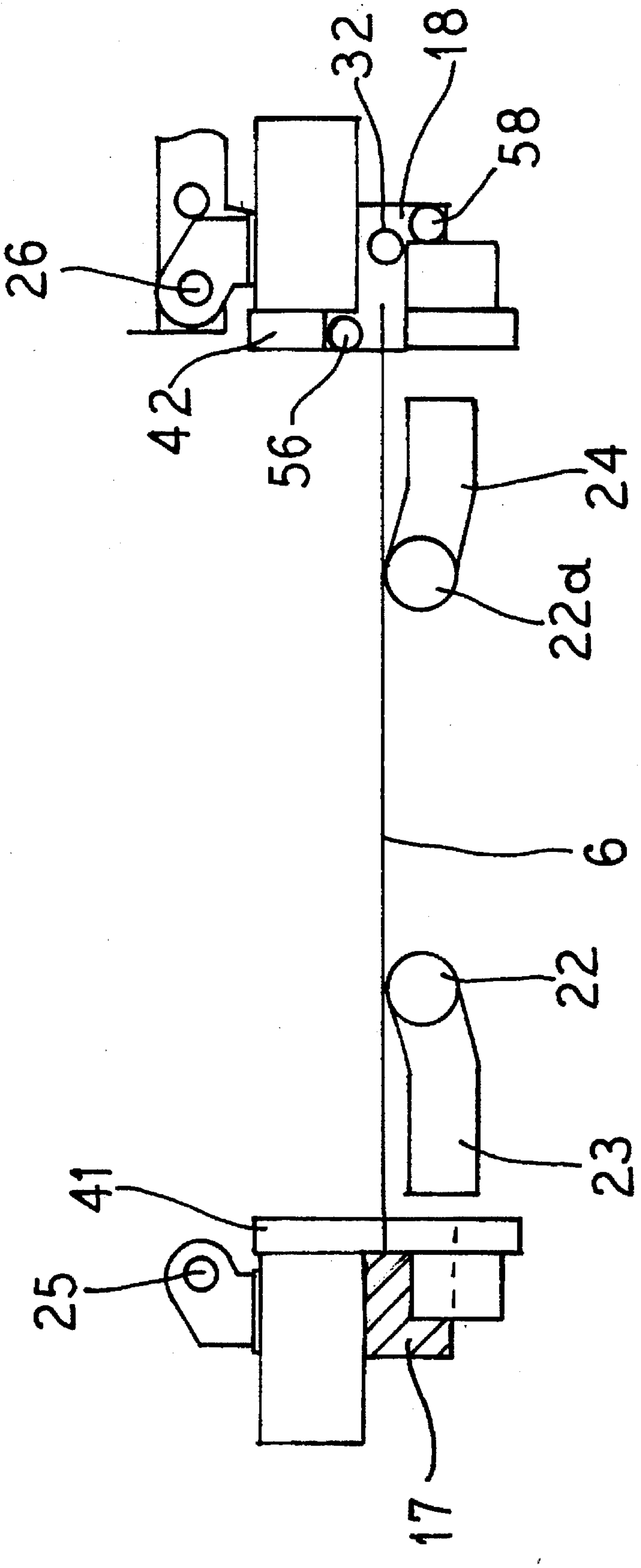
FIG. 2 is a cross section through critical parts of the laser exposer in the region of the guide means.
Figure 3:
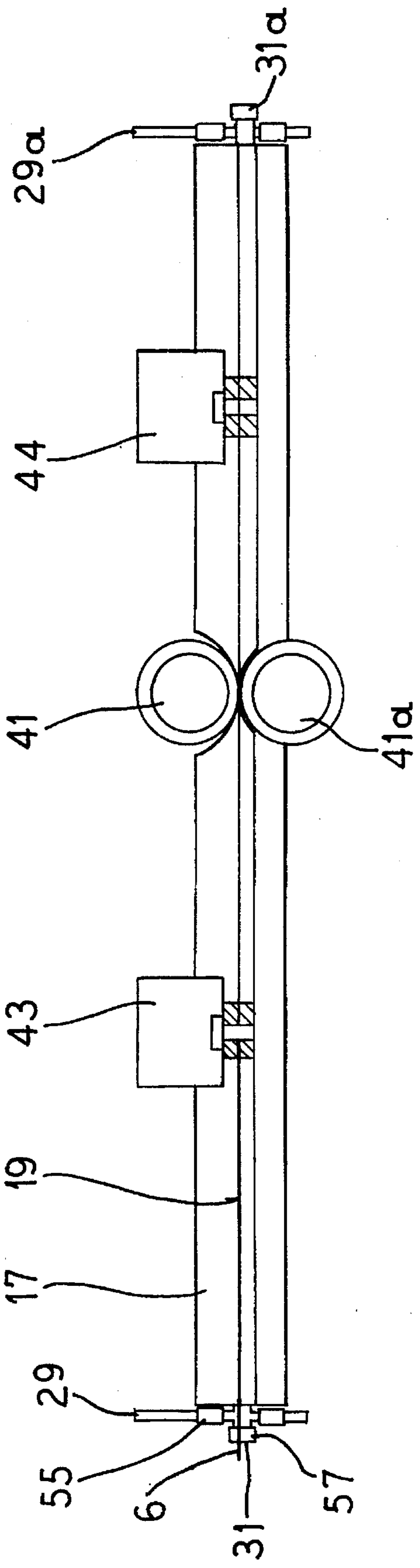
FIG. 3 is a longitudinal section through the guide means of FIG. 2.
Figure 6:
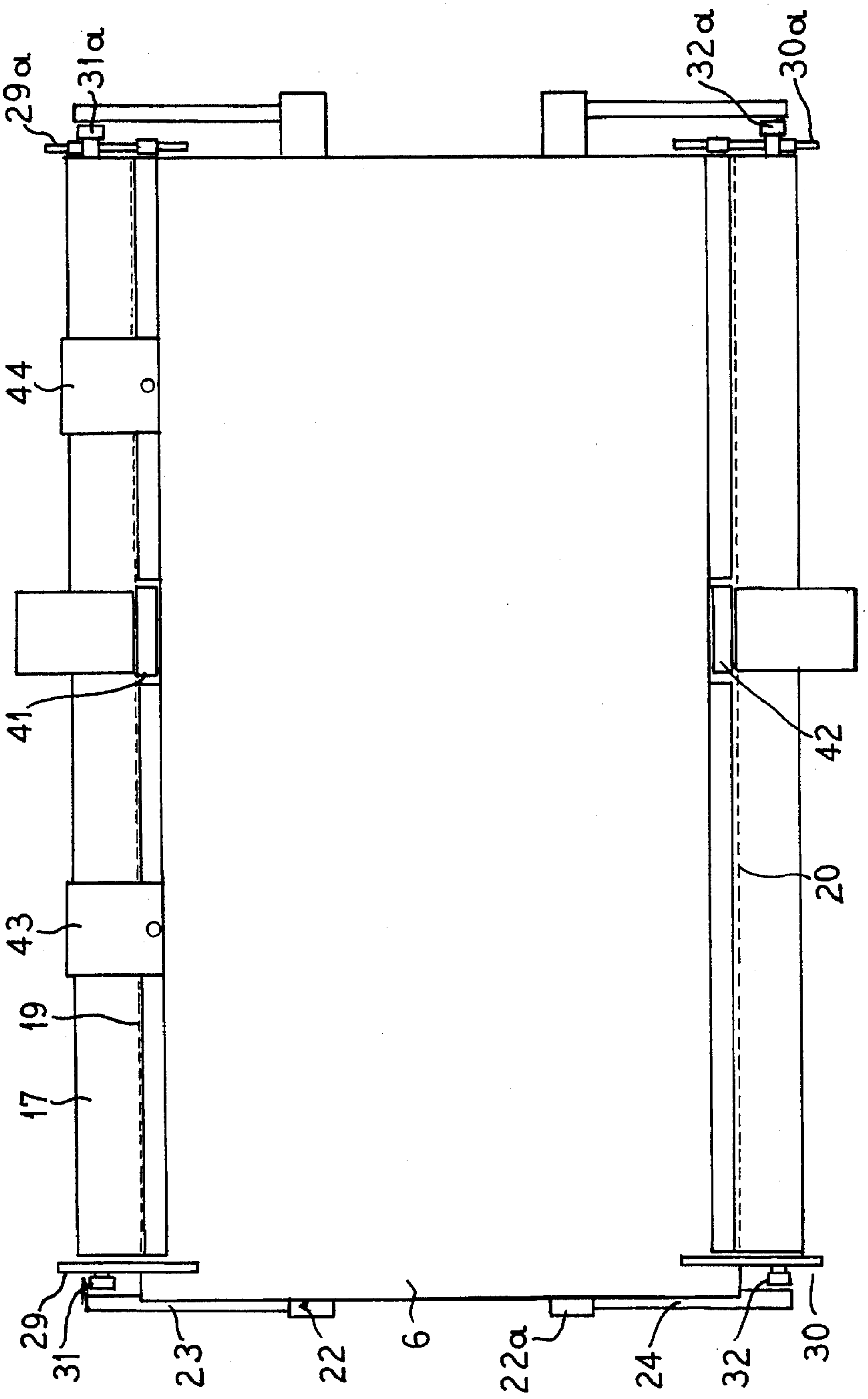
FIG. 6 is a plan view onto the part of the guide means shown in FIGS. 2 and 3.

FIG. 1 illustrates the housing of a laser exposer in longitudinal section and referenced 1, a guide means for film as the photomaterial, and shown in detail in FIGS. 2, 3 and 6, an exposure unit 2, as well as a linear guide having a crank thread drive 3 and a geared motor 4 being accommodated therein.

For exposing a film section 6—this being shown applied against a cylindrical bed 7 in FIG. 1—a rotating mirror 8 (also see FIGS. 4 and 5) rotates such that a modulated exposure ray beam 9 scans the film curved as a cylindrical section in scan lines and thereby exposes the film, namely the light-sensitive layer of the film that faces toward the rotating mirror. Moreover, the rotating mirror can shift the ray beam 9 in the longitudinal axis 10 of the cylindrical bed by a displacement path **10*a* of the exposure unit 2, scan line thus following scan line on the exposed film surface in the direction of the longitudinal axis. The film stands still during the exposure event. The linear guidance of the exposure unit 2 is referenced 5 in FIG. 4**.

A conveyor means for an unexposed film 11 serves the purpose of withdrawing the film from a cassette 12, and of introducing it into the region of the cylindrical bed 7, where a film section 6 that is cut off from the film 11 by a cutter means 13 is exposed after being seated against the inside of the cylindrical bed 7, in order to ultimately convey it out to an output cassette 14. For this purpose, the conveyor means of the film comprises a pair of input rollers 15 that are arranged between the cutter means 13 and the cassette 12, and also comprises a pair of output rollers 16 between the path of the film section in the cylindrical bed 7 and the output cassette 14. The described, conventional parts of the conveyor means require no further explanation.

A conveyor means for the film in the region of the cylindrical bed is shown in detail in FIGS. 2, 3 and 6, omitting the other parts. It is essentially composed of elements for guiding the film into the cylindrical bed 7 and for insertion, i.e. for pressing the film section against the cylindrical bed from the inside. In detail, two pivotable insertion rails 17, 18 are arranged parallel and spaced in accordance with the film width and are aligned parallel to the longitudinal axis 10 of the cylindrical bed, the two lateral edges of the film or, respectively, film section engaging into the guide slots 19, 20 of these insertion rails 17, 18 that face toward one another in order to be guided in these during conveying. The guide slots 19, 20 also serve the purpose of pivoting the film section 6 from the draw-in position shown in FIG. 2 into an upper insertion position and of forming a detent in the direction of the inside circumference of the cylindrical bed 7 in this position, whereas the other of the two pivotable insertion rails, 18 in this case, tangentially presses the film section 6 into the cylindrical bed.

Figure 4:
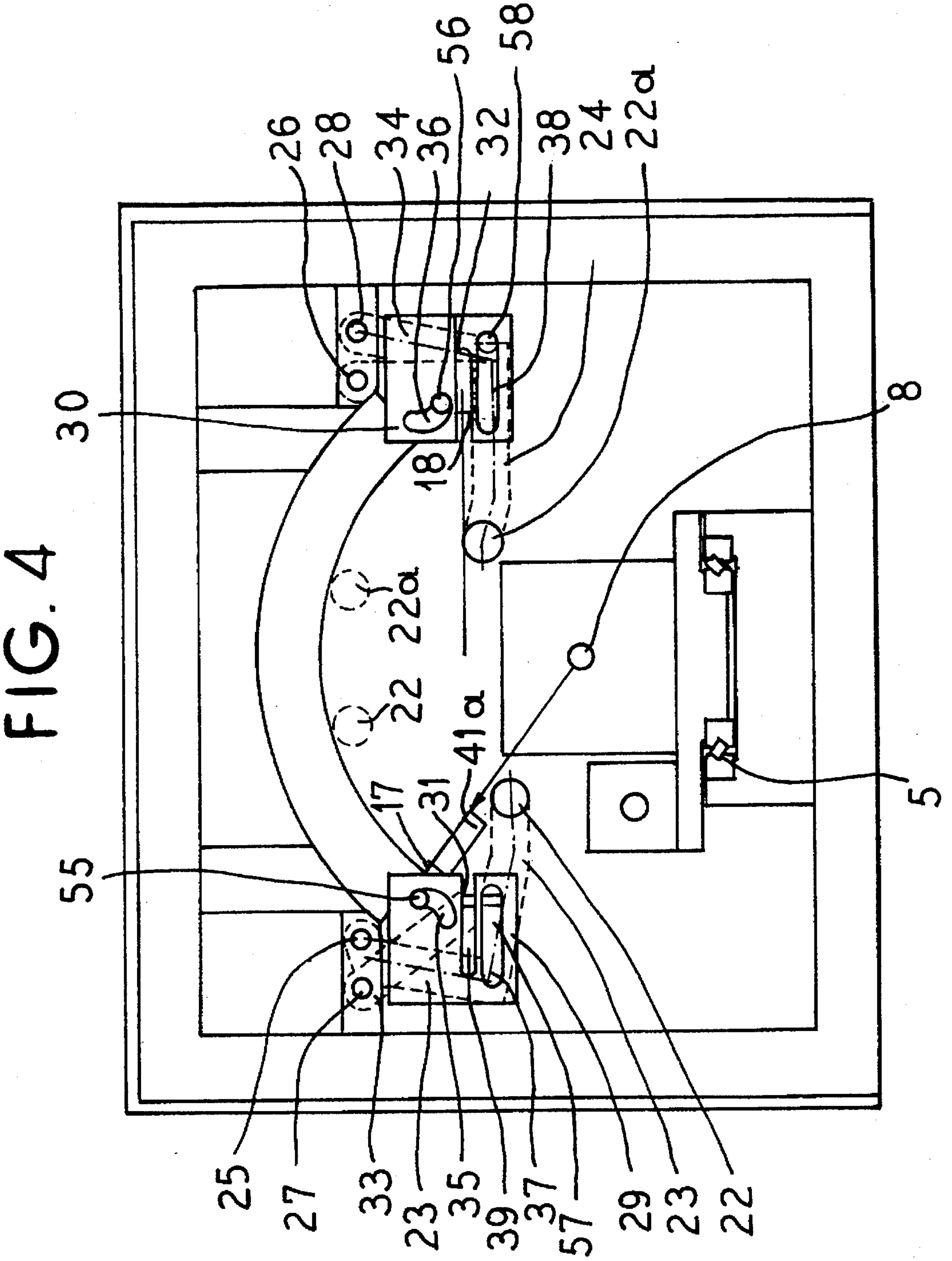
FIG. 4 is a cross section through the laser exposer in a first plane of section.
Figure 5:
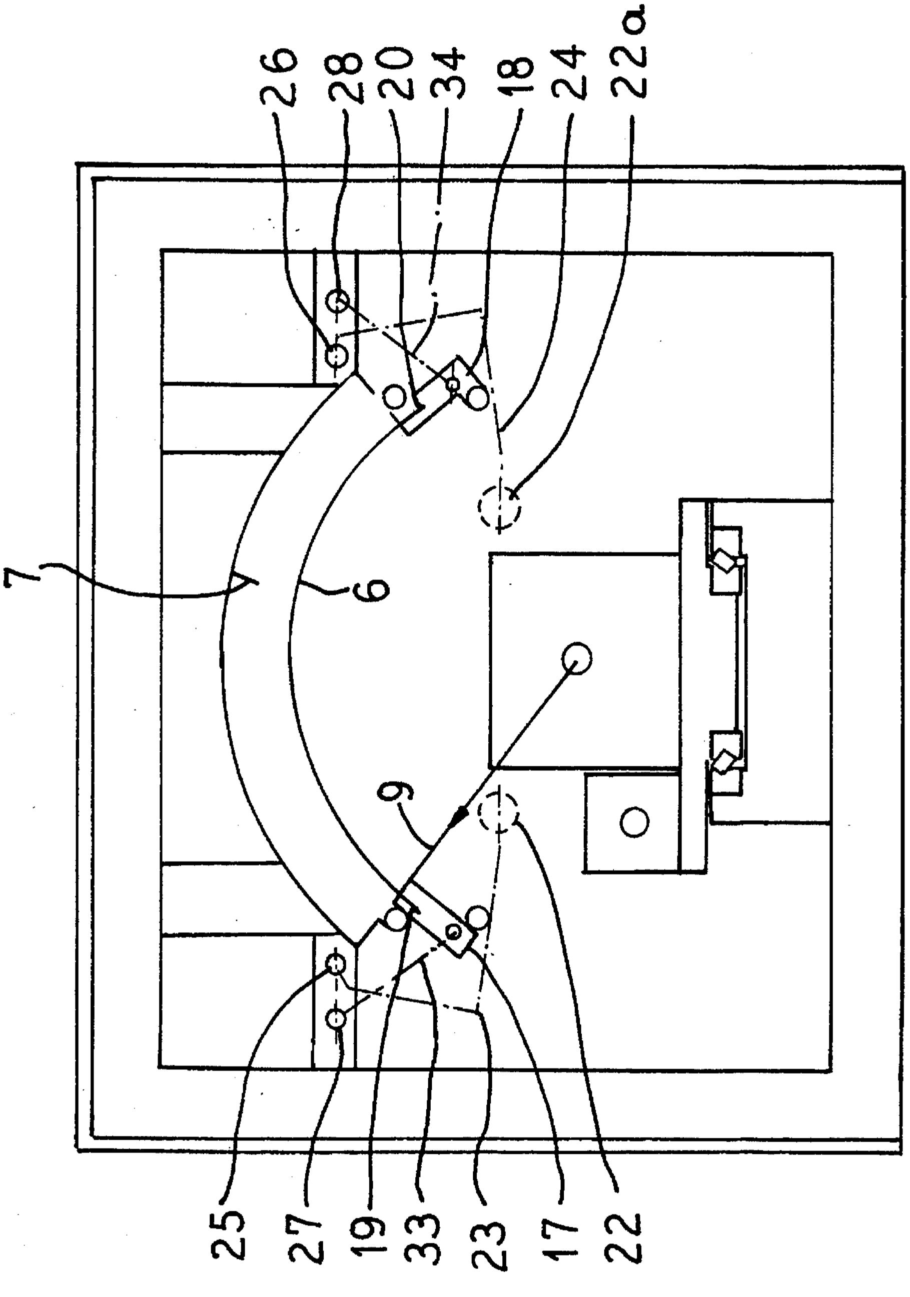
FIG. 5 shows a cross section through the laser exposer in a second plane of section.

This insertion position essentially corresponds to the exposure position shown in FIG. 5 wherein, however, rods 22, 22*a* are pivoted back out of the motion region of the ray beam 9. These pivotable rods 22, 22*a* carry the film 11 or, respectively, a film section 6 in the same, unreferenced plane during the draw-in phase as the guide slots 19, 20 of the pivotable insertion rails 18, 19. The rods are likewise aligned parallel to the longitudinal axis 10 of the cylindrical bed. Only ends of the rod 22 can be seen in FIG. 1, since the middle section of this rod has been removed for a clearer illustration of the insertion rails. It can be seen from FIG. 1 in combination with FIG. 4 how the rods 22, 22*a* are each in communication with a shaft 25, 26 via levers 23, 24. For greater clarity, the levers 23 and 24 are indicated by a dot-dashed line in FIG. 5, whereas the rods 22, 22*a* are shown with broken lines.

The bearing of the insertion rails 17, 18 derives best from FIG. 4. These insertion rails are pivotable around shafts 27, 28 which thus simultaneously represent pivot points in a plane. With respect to the central middle axis of the cylindrical bed 7, these shafts or pivot points 1 lie farther toward the outside than the shafts 25, 26. This is intended to optimize the pressing of the insertion rails in order to press the film sections 6 resiliently and laterally tangentially into the inner cylinder wall 5 of the cylindrical bed 7. A drive unit that is not shown serves the purpose of turning the shafts 25 through 28.

The insertion rails 17, 18 have their ends held by respective plates 29, 29*a*; 30, 30*a*. Rollers 55, 56, 57, 58 that engage into the guideways 35, 36, 37, 38 of the plates 29, 30 and prescribe the movement of the insertion rails are located at the ends of the insertion rails. The slots 30, 40 in the plates 20, 30 serve the purpose of allowing the moving rollers (31, 32) to pass through.

The function movements are only shown and described for the input side of the insertion rails, for they are identical at both sides. The insertion rails are moved by levers 33, 34 that are driven via shafts 27, 28 from the draw-in position (FIG. 4, right) into the exposure position (FIG. 4, left and FIG. 5). For this purpose, the levers act on the moving rollers 31, 32. A respective pair of draw-in rollers 41 or, respectively, 42 are seated in the insertion rails, their nip lying in the same plane wherein the film section 6 is held by the guide slots 19, 20 in the insertion rails 17, 18 and by the rods 22, 22*a* in the conveying position. Of the draw-in rollers, the draw-in roller that is not driven is spring-mounted and can be lifted. A cooperating roller 41*a* of the draw-in roller 41, these forming a pair of draw-in rollers with one another, may be seen from FIGS. 3 and 4.

It may also be seen from FIGS. 3 and 6 how perforating means 43, 44 are arranged at the insertion rail 17 spaced from one another.

With the described laser exposer, the film 11 is pulled from the cassette 12 with the input roller 15 and is inserted through the cutter means 13 into the insertion rails 17, 18, where the left and the right edges of the film are guided and where further conveying is assumed by the draw-in rollers 41, 42. After being cut off by the cutter means 13, further conveying of the film section 6 occurs only with the draw-in rollers 41, 42 that move the film section into the ultimate position parallel to the longitudinal axis 10. The film section thereby lies on the rods 22, 22*a*, which prevent it from falling down.

In order to place the film section 6 against the inside of the cylindrical bed 7, the rods 22, 22*a* are pivoted up with the shafts 27, 28 into the insertion position in which the shafts are shown in dashed lines in FIG. 4. At the same time, the insertion rails 17, 18 are moved—by turning the shafts 27, 28—from the draw-in position shown in FIGS. 1, 3 and 4, right-hand part, into the insertion position shown in FIG. 4, left-hand part. With respect to the position of the film and of the insertion rails 17, 18, the exposure position shown in FIG. 5 coincides with the upper insertion position, as set forth above. In the upper insertion position and in the exposure position, the film section 6 is pressed firmly adjacent against the cylindrical bed 7 by the insertion rails. The right-hand insertion rail 18 presses the film section 6 tangentially up-ended into the cylindrical bed, whereas the other film edge is supported at the bottom of the slot (not referenced) in the guide slot 19 of the insertion rail 18. When perforation is being carried out, the left-hand lateral edge of the film section 6 is held by the punches (not referenced) of the perforating means 43, 44.

After the afore-mentioned return pivot of the rods 22, 22*a* and the following exposure event, the insertion rails 17, 18 can again be pivoted back into the draw-in position and the completely exposed film section can be withdrawn from the cylindrical bed region with the output roller pair 16 and can be further-conveyed into the output cassette 14 or directly into a development apparatus. For this purpose, the laser exposer need not be placed in a darkroom.

As a consequence of the exact, constant seating of the film section against the inside of the cylindrical bed 7, exactly registered exposures from a second control device (raster image processor) are possible.

Although various minor changes and modifications might be suggested by those skilled in the art, it will be understood that I wish to include within the claims of the patent warranted hereon all such changes and modifications as reasonably come within my contribution to the art.

I claim:

1. A photosetting apparatus, comprising:

a cylindrical bed into which sheet-shaped photomaterial is transported and placed against an inside thereof, said cylindrical bed having a longitudinal axis positioned in spaced relation from an inside surface of the bed and such that the cylindrical bed inside surface curves in cylindrical fashion partially around the longitudinal axis;

an exposure optics positioned to expose the sheet-shaped photomaterial when the photomaterial is positioned in said cylindrical bed, said exposure optics being displaceable in a direction of said longitudinal axis of the cylindrical bed;

a conveyor mechanism for conveying the photomaterial parallel to and in a direction along the longitudinal axis of the cylindrical bed into a position adjacent the inside surface of the bed; and a guide mechanism having movable elements for pressing the photomaterial against the inside surface of the cylindrical bed from inside and such that lateral edges of the photomaterial lie parallel to the longitudinal axis of the cylindrical bed.

2. A photosetting apparatus according to claim 1 wherein the conveyor mechanism conveys the photomaterial planarly to a position adjacent said inside surface of the cylindrical bed, and said guide mechanism movable elements arc the planar photomaterial up towards the inside surface of the cylindrical bed until the photomaterial is seated against the inside surface thereof.

3. A photosetting apparatus according to claim 2 wherein:

said guide mechanism comprises two pivotable insertion rails arranged at a spacing from one another and each having a guide slot;

said guide mechanism further comprising pivotable rods on which the photomaterial rests in a drawn-in position and in a substantially flat plane, said rods being pivotable into an upper insertion position where they press the photomaterial from the drawn-in position into the cylindrical bed;

said insertion rails being pivotable into an insertion position into which the photomaterial is pressed into the cylindrical bed; and said pivotable rods being pivotable back away from the photomaterial during exposure.

4. A photosetting apparatus according to claim 3 wherein each of the two insertion rails each comprises a pair of photomaterial draw-in rollers and wherein a nip of each pair lies in a plane of the guide slots.

5. A photosetting apparatus according to claim 4 wherein at least one of the draw-in rollers of a pair is spring mounted and liftable.

6. A photosetting apparatus according to claim 3 wherein at least one of the insertion rails comprises a means for perforating.

7. A photosetting apparatus according to claim 3 wherein the pivotable insertion rails are guided in guide plates, and wherein at least one guide roller seated at each of the insertion rails engages into at least one guideway in the respective guide plate.

8. A photosetting apparatus according to claim 3 wherein the pivotable rods are each connected by at least one lever with a shaft with which the pivotable rods are pivotable.

9. A photosetting apparatus according to claim 3 wherein said guide means comprises an input roller pair with which the photomaterial can be conveyed from an input storage location to said drawn-in position adjacent the cylindrical bed, and further comprises an output roller pair with which the photomaterial can be conveyed out from the drawn-in position adjacent the cylindrical bed to an output location.

10. A photosetting apparatus according to claim 9 wherein a cutter mechanism is arranged between said input roller pair and the insertion rails, and wherein said rails are provided for continued conveying of cut-off film material to a contact position with the inside of the cylindrical bed.

11. A photosetting apparatus, comprising:

a cylindrical bed having a concave inside surface onto and against which sheet-shaped photomaterial is transported, said cylindrical bed having a longitudinal axis positioned in spaced relation from said inside surface and such that said inside surface curves in cylindrical fashion partially around said longitudinal axis;

an exposure optics in a position facing said inside surface of said cylindrical bed for exposing said sheet-shaped photomaterial;

a conveyor mechanism for conveying the photomaterial parallel to and in a direction along the longitudinal axis of the cylindrical bed from a position remote from the cylindrical bed to a drawn-in position directly adjacent the cylindrical bed; and a guide mechanism for pressing the photomaterial against the cylindrical bed inside surface such that lateral edges of the photomaterial lie parallel to the longitudinal axis of the cylindrical bed.

12. A photosetting apparatus according to claim 11 wherein said guide mechanism comprises pivotable insertion rails which engage said lateral edges of said photomaterial and bend the photomaterial into a curved arc-like configuration to match a curvature of the cylindrical bed.

13. A photosetting apparatus according to claim 11 wherein at least one displaceable rod extending parallel to said longitudinal axis pushes the photomaterial towards the concave inside surface and into contact therewith.

14. A method for inserting photomaterial into a photosetting apparatus having a cylindrical bed with a curved inside surface against which a sheet material is inwardly pressed for exposure, and wherein said curved inside surface of said cylindrical bed has a longitudinal axis around which said inside surface partially curves in cylindrical fashion, comprising the steps of:

moving the photomaterial in a longitudinal direction along and parallel to said longitudinal axis in an essentially flat plane into a drawn-in position opposite said curved inside surface of said cylindrical bed;

bending the photomaterial and pressing the photomaterial into position against said curved inside surface of said cylindrical bed;

exposing the photomaterial;

after exposure moving the photomaterial away from the cylindrical bed back into a flat plane; and conveying the photomaterial in a flat plane away from the cylindrical bed.

15. A method according to claim 14 including the steps of providing said cylindrical bed so that said curved inside surface is facing concave downwardly; and pressing said photomaterial in curved fashion straight up into the concave curved surface and against it prior to exposure.

* * * * *